(12) United States Patent
Rheaume

(10) Patent No.: US 6,247,018 B1
(45) Date of Patent: Jun. 12, 2001

(54) METHOD FOR PROCESSING A FILE TO GENERATE A DATABASE

(75) Inventor: Gary P. Rheaume, Barrington, NH (US)

(73) Assignee: Platinum Technology IP, Inc., Oakbrook Terrace, IL (US)

( * ) Notice: Subject to any disclaimer, the term of this patent is extended or adjusted under 35 U.S.C. 154(b) by 0 days.

(21) Appl. No.: 09/061,819

(22) Filed: Apr. 16, 1998

(51) Int. Cl.[7] .................................................. G06F 17/30
(52) U.S. Cl. .................................................. 707/102; 3/509
(58) Field of Search ................................. 707/3, 102, 509

(56) References Cited

U.S. PATENT DOCUMENTS

| | | | |
|---|---|---|---|
| 5,297,249 | | 3/1994 | Bernstein et al. ............... 345/356 |
| 5,355,472 | * | 10/1994 | Lewis ................................ 707/101 |
| 5,564,046 | * | 10/1996 | Nemoto et al. .................. 707/102 |
| 5,603,025 | | 2/1997 | Tabb et al. ........................ 707/2 |
| 5,630,117 | | 5/1997 | Oren et al. ....................... 707/100 |
| 5,694,594 | | 12/1997 | Chang .............................. 707/6 |
| 5,706,434 | | 1/1998 | Kremen et al. .................. 709/218 |
| 5,721,903 | | 2/1998 | Anand et al. ..................... 707/5 |
| 5,729,730 | | 3/1998 | Wlaschin et al. ................ 707/3 |
| 5,778,390 | * | 7/1998 | Nelson et al. .................... 707/204 |
| 5,799,268 | * | 8/1998 | Boguraev .......................... 704/9 |
| 5,884,310 | * | 3/1999 | Brichta et al. .................... 707/10 |
| 5,956,709 | * | 9/1999 | Xue .................................. 707/3 |
| 5,999,933 | * | 12/1999 | Mehta ............................... 707/100 |
| 6,031,989 | * | 2/2000 | Cordell ............................. 395/701 |
| 6,052,693 | * | 4/2000 | Smith et al. ...................... 707/104 |
| 6,151,599 | * | 11/2000 | Shrader et al. ................... 707/9 |
| 6,151,609 | * | 11/2000 | Truong ............................. 707/505 |
| 6,163,779 | * | 12/2000 | Mantha et al. ................... 707/100 |

OTHER PUBLICATIONS

Microsoft Press ("New Features in Detail in Microsoft Access 97", http://esko.lpt.fi/Opetus/Kurssit/tietotek/Www-w-palvelu/60%20Minute%20Intranet%20Kit/60%20Minute%20Intranet%20Kit/intranetpeg/intacc3.htm, pp. 1–9, 1997).*

* cited by examiner

Primary Examiner—Wayne Amsbury
(74) Attorney, Agent, or Firm—Baker & McKenzie

(57) ABSTRACT

A method for automatically processing a file, such as a web page or an ASCII file, is provided to treat the file as a database with one or more database tables. An HTML page is retrieved from a user specified URL or from a disk file and is parsed for any HTML tables or text blocks that are translated into a database table in a database representation of the HTML page. ASCII files can also be parsed to identify data blocks to be represented as a database table.

32 Claims, 19 Drawing Sheets

FIG. 1

```
<html>

<head>
    </head>
611
    <frameset rows="50%, *">
631     <frame src="\texttbl.htm" NAME="text tables" marginwidth="1" marginheight="1">
632     <frame src="\htmltbl.htm" NAME="HTML tables" marginwidth="1" marginheight="1">
    </frameset>

</html>
```

FIG. 3C

```
        <TD></TD>
        <TD>Nomination Confirmed</TD>
        <TD>nomination richard 1 young to be us district judge</TD>
    </TR>
</TABLE>

</BODY>
</HTML>
```

FIG. 2

```
<HTML>
<HEAD>
</HEAD>
<BODY BGCOLOR="#FFFFFF">

<H2>DRMS Search Results</H2>
<H3>Property for Public Sale</H3>
Thu Apr  2 16:03:58 1998
                                                                        Record Range: 0 - 300
PSC(s) : 42 43 4931
Sales Status : All Items
Sites : All sites.
<PRE WIDTH=119>  210    220                      230                    240       250    260
SAN DIEGO CA.    VOLTAGE DIVIDER,DEC  <A HREF="/qry?n=01305377">001305377</A> R53824B02   1  EA  A  06-FEB-98
HUNTSVILLE AL.   CALCULATOR,ELECTRON  <A HREF="/qry?n=01081741">001081741</A> W31G3G734   1  EA  A  22-JAN-98
LETTERKENNY PA.  GENERATOR,SIGNAL     <A HREF="/qry?n=10197939">010197939</A> W31G3H717   1  EA  B  10-JUL-97
LETTERKENNY PA.  PLUG-IN,RADIO FREQU  <A HREF="/qry?n=10600327">010600327</A> W31G3H717   4  EA  B  10-JUL-97
LETTERKENNY PA.  CALIBRATOR,DIAL IND  <A HREF="/qry?n=04211629">004211629</A> W81NMC726   1  EA  B  21-OCT-97
RICHMOND VA.     DIFFERENTIAL VOLTME  <A HREF="/qry?n=04072642">004072642</A> W26L8F615   1  EA  B  02-MAY-97
HUNTSVILLE AL.   DEBURRING KIT        <A HREF="/qry?n=01324799">001324799</A> W31G3G724   1  EA  A  04-NOV-97
HUNTSVILLE AL.   RATIO SET,ADJUSTABL  <A HREF="/qry?n=01352394">001352394</A> W31G3G724   1  EA  A  04-NOV-97
HUNTSVILLE AL.   BALANCE UNIT,THERMO  <A HREF="/qry?n=01987642">001987642</A> W31G3G724   1  EA  A  04-NOV-97

KNOX KY.         FIXTURE,TELESCOPE T  <A HREF="/qry?n=07691596">007691596</A> W22PEQ735
SPARTA WI.       FIXTURE,CROSS LEVEL  <A HREF="/qry?n=10510839">010510839</A> W5CK4Y734
STOCKTON CA.     CIRCUIT CARD ASSEMB  <A HREF="/qry?n=10032868">010032868</A> W31G3H732
ANNISTON AL.     METER                <A HREF="/qry?n=07779517">007779517</A> W31G3H725
OFFUTT NE.       ADAPTER,FIXTURE      <A HREF="/qry?n=00340897">000340897</A> W81D5A626
BRAGG NC.        TEST SET,CALIBRATIO  <A HREF="/qry?n=10140949">010140949</A> W81YT4801
BRAGG NC.        PLUG-IN,VIDEO AMPLI  <A HREF="/qry?n=10401493">010401493</A> W81YT4801

BRAGG NC.        EXTENDER BOARD       <A HREF="/qry?n=10682001">010682001</A> W81YT4801   1  EA  A  11-FEB-98
HUNTSVILLE AL.   STANDARD MISMATCH    <A HREF="/qry?n=04209039">004209039</A> W31G3G723   1  EA  A  24-SEP-97
FOREST PARK GA.  TUNING UNIT,RADIO F  <A HREF="/qry?n=00782918">000782918</A> W33NYU520   2  EA  B  11-MAR-96
CAMPBELL KY.     TEST SET,STABILIZAT  <A HREF="/qry?n=10467893">010467893</A> W81JND709   8  SE  B  10-SEP-97
TEXARKANA TX.    CARD HOLDER ASSEMBL  <A HREF="/qry?n=10850475">010850475</A> W52H09725   8  EA  A  08-JAN-98
STOCKTON CA.     TEST MOBILE          <A HREF="/qry?n=12654600">012654600</A> W31G3H727   4  EA  B  06-OCT-97
ANNISTON AL.     CONVERTER,COAXIAL T  <A HREF="/qry?n=01781053">001781053</A> W31G3H725   3  EA  A  25-OCT-97
ANNISTON AL.     CLAMP,COAXIAL        <A HREF="/qry?n=08156232">008156232</A> W31G3H725  24  EA  B  25-OCT-97
</BODY>
</HTML>
```

FIG. 3A

```
<HTML>
<HEAD>
</HEAD>

<BODY BGCOLOR="#FFFFFF">

<FONT SIZE=+2 face="arial" color="#999999"><B>U.S. Senate Roll Call Votes<BR>
105<SUP>th</SUP> Congress - 2<SUP>nd</SUP> Session (1998)</B></FONT><BR>

<HR>

<TABLE WIDTH=100% BORDER=2>
    <CAPTION>"U.S. Senate Roll Call Votes"</CAPTION>
    <TR><TH>Vote</TH><TH>Date</TH><TH>Bill</TH><Result></TH><TH>Title/Description</TH></TR>
    <TR>
        <TD><A HREF='/activities/105-2/vote_00060.html'>60</TD>
        <TD>1-Apr</TD>
        <TD>S.CON.RES.86</TD>
        <TD>Motion Rejected</TD>
        <TD>Motion to wave CBA Re: Craig Amdt. No.2211</TD>
    </TR>
    <TR>
        <TD><A HREF='/activities/105-2/vote_00059.html'>59</TD>
        <TD>1-Apr</TD>
        <TD>S.CON.RES.86</TD>
        <TD>Amendment Agreed to</TD>
        <TD>Faircloth Amdt. No. 2251</TD>
    </TR>
    <TR>
        <TD><A HREF='/activities/105-2/vote_00058.html'>58</TD>
        <TD>1-Apr</TD>
        <TD>S.CON.RES.86</TD>
        <TD>Motion Rejected</TD>
        <TD>Motion to wave CBA Re: Hollings and No.2193</TD>
    </TR>
    <TR>
        <TD><A HREF='/activities/105-2/vote_00057.html'>57</TD>
        <TD>1-Apr</TD>
        <TD>S.CON.RES.86</TD>
        <TD>Motion to Table Agreed to</TD>
        <TD>Motion to table Moseley-Braun Amdt No. 2175</TD>
    </TR>
    <TR>
        <TD><A HREF='/activities/105-2/vote_00056.html'>56</TD>
        <TD>1-Apr</TD>
```

FIG. 3B

```
        <TD>S.CON.RES.86</TD>
        <TD>Ammedment Agreed to</TD>
        <TD>Roth Amdt. No 2209</TD>
    </TR>
</TABLE>

<HR>

<TABLE WIDTH=100% BORDER=0>
    <TR><TH>Vote</TH><TH>Date</TH><TH>Bill</TH><TH>Result</TH><TH>Title/Description</TH></TR>
    <TR>
        <TD><A HREF='/activities/105-2/vote_00022.html'>22</TD>
        <TD>5-Mar</TD>
        <TD>S.1173</TD>
        <TD>Amendment Rejected</TD>
        <TD>bingaman amendment no. 1696 as modified</TD>
    </TR>
    <TR>
        <TD><A HREF='/activities/105-2/vote_00021.html'>21</TD>
        <TD>5-Mar</TD>
        <TD>S.1173</TD>
        <TD>Amendment Agreed to</TD>
        <TD>dorgan amendment no. 1697</TD>
    </TR>
    <TR>
        <TD><A HREF='/activities/105-2/vote_00020.html'>20</TD>
        <TD>4-Mar</TD>
        <TD>S.1173</TD>
        <TD>Amendment Agreed to</TD>
        <TD>DeWine/Lautenberg amendment (sp1682)</TD>
    </TR>
    <TR>
        <TD><A HREF='/activities/105-2/vote_00019.html'>19</TD>
        <TD>3-Mar</TD>
        <TD>S.1173</TD>
        <TD>Motion to Table Agreed to</TD>
        <TD>motion to table wellstone amendment no. 1679</TD>
    </TR>
    <TR>
        <TD><A HREF='/activities/105-2/vote_00018.html'>18</TD>
        <TD>2-Mar</TD>
```

FIG. 4

DRMS Search Results

Property for Public Sale

The Apr 2 16:03:58 1998 Record Range: 0-300 FSC(s):42 43 4931 Sales Status: All Items Sites: All sites.

| | | | | | |
|---|---|---|---|---|---|
| SAN DIEGO CA. | VOLTAGE DIVIDER,DEC | 001305377 | R53824802 | 1 EA A | 06-FEB-98 |
| HUNSTVILLE AL. | CALCULATOR,ELECTRON | 001081741 | W31G3G734 | 1 EA A | 22-JAN-98 |
| LETTERHENNY PA. | GENERATOR,SIGNAL | 010197939 | W31G3H717 | 1 EA B | 10-JUL-97 |
| LETTERHENNY PA. | PLUG-IN,RADIO FREQU | 010600327 | W31G3H717 | 4 EA B | 10-JUL-97 |
| LETTERHENNY PA. | CALIBRATOR,DIAL IND | 004211629 | W81NMC726 | 1 EA B | 21-OCT-97 |
| RICHMOND VA. | DIFFERENTIAL VOLTME | 004072642 | W26L8F615 | 1 EA B | 02-MAY-97 |

U.S. Senate Roll Call Votes
105th Congress - 2nd Session (1998)

| Vote | Date | Bill | Result | Title/Description |
|---|---|---|---|---|
| 60 | 1-Apr | S.CON.RES.86 | Motion Rejected | Motion to wave CBA Re:Craig Amdt. No 2211 |
| 59 | 1-Apr | S.CON.RES.86 | Amendment Agreed to | Faircloth Amdt. No. 2251 |
| 58 | 1-Apr | S.CON.RES.86 | Motion Rejected | Motion to wave CBA Re: Hollings and No. 2193 |
| 57 | 1-Apr | S.CON.RES.86 | Motion to Table Agreed to | Motion to table Moseley-Braun Amdt. No. 2175 |
| 56 | 1-Apr | S.CON.RES.86 | Amendment Agreed to | Roth Amdt. No. 2209 |

| Vote | Date | Bill | Result | Title/Description |
|---|---|---|---|---|

FIG. 5A

```
DRMS Search Results
Property for Public Sale
Thu Apr 2 16:03:58 1998 Record Range: 0-300 FSC(s):42 43 4931 Sales Status: All Items Sites: All sites.

SAN DIEGO CA.     VOLTAGE DIVIDER,DEC   001305377 R53824802    1  EA   A  06-FEB-98
HUNSTVILLE AL.    CALCULATOR,ELECTRON   001081741 W31G3G734    1  EA   A  22-JAN-98
LETTERHENNY PA.   GENERATOR,SIGNAL      010197939 W31G3H717    1  EA   B  10-JUL-97
LETTERHENNY PA.   PLUG-IN,RADIO FREQU   010600327 W31G3H717    4  EA   B  10-JUL-97
LETTERHENNY PA.   CALIBRATOR,DIAL IND   004211629 W81NMC726    1  EA   B  21-OCT-97
RICHMOND VA.      DIFFERENTIAL VOLTME   004072642 W26L8F615    1  EA   B  02-MAY-97
HUNTSVILLE AL.    DEBURRING KIT         001324799 W31G3G724    1  EA   A  04-NOV-97
HUNTSVILLE AL.    RATIO SET,ADJUSTABL   001352394 W31G3G724    1  EA   A  04-NOV-97
HUNTSVILLE AL.    BALANCE UNIT,THERMO   001987642 W31G3G724    1  EA   A  04-NOV-97

KNOX KY.          FIXTURE,TELESCOPE T   007691596 W22PEQ735
SPARTA WI.        FIXTURE,CROSS LEVEL   010510839 W5CK4Y734
STOCKTON CA.      CIRCUIT CARD ASSEMB   010032868 W31G3H732
ANNISTON AL.      METER                 007779517 W31G3H725
OFFUTT NE.        ADAPTER,FIXTURE       000340897 W81D5A626
BRAGG NC.         TEST SET,CALIBRATIO   010140949 W81YT4801
BRAGG NC.         PLUG-IN,VIDEO AMPLI   010401493 W81YT4801

BRAGG NC.         EXTENDER BOARD        010682001 W81YT4801    1  EA   A  11-FEB-98
HUNTSVILLE AL.    STANDARD MISMATCH     004209039 W31G3G723    1  EA   A  24-SEP-97
FOREST PARK GA.   TUNING UNIT,RADIO F   000782918 W33NYU520    2  EA   B  11-MAR-96
CAMPBELL KY.      TEST SET,STABILIZAT   010467893 W81JND709    8  SE   B  10-SEP-97
TEXARKANNA TX.    CARD HOLDER ASSEMBL   010850475 W52H09725    8  EA   A  08-JAN-98
STOCKTON CA.      TEST MOBILE           012654600 W31G3H727    4  EA   B  06-OCT-97
ANNISTON AL.      CONVERTER,COAXIAL T   001781053 W31G3H725    3  EA   A  25-OCT-97
ANNISTON AL.      CLAMP,COAXIAL         008156232 W31G3H725   24  EA   B  25-OCT-97
```

FIG. 5B

| U.S. Senate Roll Call Votes 105th Congress - 2nd Session (1998) | | | | |
|---|---|---|---|---|
| Vote | Date | Bill | Result | Title/Description |
| 60 | 1-Apr | S.CON.RES.86 | Motion Rejected | Motion to wave CBA Re:Craig Amdt. No 2211 |
| 59 | 1-Apr | S.CON.RES.86 | Amendment Ageed to | Faircloth Amdt. No. 2251 |
| 58 | 1-Apr | S.CON.RES.86 | Motion Rejected | Motion to wave CBA Re: Hollings and No. 2193 |
| 57 | 1-Apr | S.CON.RES.86 | Motion to Table Agreed to | Motion to table Moseley-Braun Amdt No. 2175 |
| 56 | 1-Apr | S.CON.RES.86 | Amendment Agreed to | Roth Amdt. No. 2209 |
| Vote | Date | Bill | Result | Title/Description |
| 22 | 5-Mar | S.1173 | Amendment Rejected | bingaman amendment no. 1696 as modified |
| 21 | 5-Mar | S.1173 | Amendment Agreed to | dorgan amendment no. 1697 |
| 20 | 4-Mar | S.1173 | Amendment Agreed to | DeWine/Lautenberg amendment (sp 1682) |
| 19 | 3-Mar | S.1173 | Motion to Table Agreed to | motion to table wellstone amendment no. 1679 |
| 18 | 2-Mar | | Nomination Confirmed | nomination richard l young to be us district judge |

FIG. 7A

```
<html>

<head>
</head>

<frameset rows="50%,*">
    <frame src="texttbl.htm" NAME="text tables" marginwidth="1" marginheight="1">
    <frame src="texttbl.htm" NAME="HTML tables" marginwidth="1" marginheight="1">
</frameset>

</html>
<HTML>
<HEAD>
</HEAD>
<BODY BGCOLOR="#FFFFFF">

<H2>DRMS Search Results</H2>
<H3>Property for Public Sale</H3>
Thu Apr  2 16:03:58 1998
                                                                                    Record Range: 0 - 300
PSC(s) : 42 43 4931
Sales Status : All Items
Sites : All sites.
<PRE WIDTH=119>

SAN DIEGO CA.     VOLTAGE DIVIDER,DEC   <A HREF="/qry?n=01305377">001305377</A> R53824802   1 EA   A  06-FEB-98
HUNTSVILLE AL.    CALCULATOR,ELECTRON   <A HREF="/qry?n=01081741">001081741</A> W31G3G734   1 EA   A  22-JAN-98
LETTERKENNY PA.   GENERATOR,SIGNAL      <A HREF="/qry?n=10197939">010197939</A> W31G3H717   1 EA   B  10-JUL-97
LETTERKENNY PA.   PLUG-IN,RADIO FREQU   <A HREF="/qry?n=10600327">010600327</A> W31G3H717   4 EA   B  10-JUL-97
LETTERKENNY PA.   CALIBRATOR,DIAL IND   <A HREF="/qry?n=04211629">004211629</A> W81NMC726   1 EA   B  21-OCT-97
RICHMOND VA.      DIFFERENTIAL VOLTME   <A HREF="/qry?n=04072642">004072642</A> W26LBF615   1 EA   B  02-MAY-97
HUNTSVILLE AL.    DEBURRING KIT         <A HREF="/qry?n=01324799">001324799</A> W31G3G724   1 EA   A  04-NOV-97
HUNTSVILLE AL.    RATIO SET,ADJUSTABL   <A HREF="/qry?n=01352394">001352394</A> W31G3G724   1 EA   A  04-NOV-97
HUNTSVILLE AL.    BALANCE UNIT,THERMO   <A HREF="/qry?n=01987642">001987642</A> W31G3G724   1 EA   A  04-NOV-97

KNOX KY.          FIXTURE,TELESCOPE T   <A HREF="/qry?n=07691596">007691596</A> W22PEQ735
SPARTA WI.        FIXTURE,CROSS LEVEL   <A HREF="/qry?n=10510839">010510839</A> W5CK4Y734
STOCKTON CA.      CIRCUIT CARD ASSEMB   <A HREF="/qry?n=10032868">010032868</A> W31G3H732
ANNISTON AL.      METER                 <A HREF="/qry?n=07779517">007779517</A> W31G3H725
OFFUTT NE.        ADAPTER,FIXTURE       <A HREF="/qry?n=00340897">000340897</A> W81D5A626
BRAGG NC.         TEST SET,CALIBRATIO   <A HREF="/qry?n=10140949">010140949</A> W81YT4801
BRAGG NC.         PLUG-IN,VIDEO AMPLI   <A HREF="/qry?n=10401493">010401493</A> W81YT4801

BRAGG NC.         EXTENDER BOARD        <A HREF="/qry?n=10682001">010682001</A> W81YT4801   1 EA   A  11-FEB-98
HUNTSVILLE AL.    STANDARD MISMATCH     <A HREF="/qry?n=04209039">004209039</A> W31G3G723   1 EA   A  24-SEP-97
```

FIG. 7B

```
FOREST PARK GA.   TUNING UNIT,RADIO F   <A HREF="/qry?n=00782918">000782918</A> W33NYU520    2 EA  B  11-MAR-96
CAMPBELL KY.      TEST SET,STABILIZAT   <A HREF="/qry?n=10467893">010467893</A> W81JND709    8 SE  B  10-SEP-97
TEXARKANA TX.     CARD HOLDER ASSEMBL   <A HREF="/qry?n=10850475">010850475</A> W52H09725    8 EA  A  08-JAN-98
STOCKTON CA.      TEST MOBILE           <A HREF="/qry?n=12654600">012654600</A> W31G3H727    4 EA  B  06-OCT-97
ANNISTON AL.      CONVERTER,COAXIAL T   <A HREF="/qry?n=01781053">001781053</A> W31G3H725    3 EA  A  25-OCT-97
ANNISTON AL.      CLAMP,COAXIAL         <A HREF="/qry?n=08156232">008156232</A> W31G3H725   24 EA  B  25-OCT-97
</BODY>
</HTML>
<HTML>
<HEAD>
</HEAD>

<BODY BGCOLOR="#FFFFFF">

<FONT SIZE=+2 face="arial" color="#999999"><B>U.S. Senate Roll Call Votes<BR>
105<SUP>th</SUP> Congress - 2<SUP>nd</SUP> Session (1998)</B></FONT><BR>

<HR>

<TABLE WIDTH=100% BORDER=2>
    <CAPTION>"U.S. Senate Roll Call Votes"</CAPTION>
    <TR><TH>Vote</TH><TH>Date</TH><TH><Bill</TH><Result</TH><TH>Title/Description</TH></TR>
    <TR>
        <TD><A HREF='/activities/105-2/vote_00060.html'>60</TD>
        <TD>1-Apr</TD>
        <TD>S.CON.RES.86</TD>
        <TD>Motion Rejected</TD>
        <TD>Motion to wave CBA Re: Craig Amdt. No.2211</TD>
    </TR>
    <TR>
        <TD><A HREF='/activities/105-2/vote_00059.html'>59</TD>
        <TD>1-Apr</TD>
        <TD>S.CON.RES.86</TD>
        <TD>Ammedment Agreed to</TD>
        <TD>Faircloth Amdt. No. 2251</TD>
    </TR>
    <TR>
        <TD><A HREF='/activities/105-2/vote_00058.html'>58</TD>
        <TD>1-Apr</TD>
        <TD>S.CON.RES.86</TD>
        <TD>Motion Rejected</TD>
        <TD>Motion to wave CBA Re: Hollings and No.2193</TD>
    </TR>
    <TR>
        <TD><A HREF='/activities/105-2/vote_00057.html'>57</TD>
```

FIG. 7C

```
        <TD>1-Apr</TD>
        <TD>S.CON.RES.86</TD>
        <TD>Motion to Table Agreed to</TD>
        <TD>Motion to table Moseley-Braun Amdt. No. 2175</TD>
    </TR>
    <TR>
        <TD><A HREF='/activities/105-2/vote_00056.html'>56</TD>
        <TD>1-Apr</TD>
        <TD>S.CON.RES.86</TD>
        <TD>Ammedment Agreed to</TD>
        <TD>Roth Amdt. No 2209</TD>
    </TR>
</TABLE>

<HR>

<TABLE WIDTH=100% BORDER=0>
    <TR><TH>Vote</TH><TH>Date</TH><TH>Bill</TH><TH>Result</TH><TH>Title/Description</TH></TR>
    <TR>
        <TD><A HREF='/activities/105-2/vote_00022.html'>22</TD>
        <TD>5-Mar</TD>
        <TD>S.1173</TD>
        <TD>Amendment Rejected</TD>
        <TD>bingaman amendment no. 1696 as modified</TD>
    </TR>
    <TR>
        <TD><A HREF='/activities/105-2/vote_00021.html'>21</TD>
        <TD>5-Mar</TD>
        <TD>S.1173</TD>
        <TD>Amendment Agreed to</TD>
        <TD>dorgan amendment no. 1697</TD>
    </TR>
    <TR>
        <TD><A HREF='/activities/105-2/vote_00020.html'>20</TD>
        <TD>4-Mar</TD>
        <TD>S.1173</TD>
        <TD>Amendment Agreed to</TD>
        <TD>DeWine/Lautenberg amendment (sp1682)</TD>
    </TR>
    <TR>
        <TD><A HREF='/activities/105-2/vote_00019.html'>19</TD>
```

FIG. 7D

```
        <TD>3-Mar</TD>
        <TD>S.1173</TD>
        <TD>Motion to Table Agreed to</TD>
        <TD>motion to table wellstone amendment no. 1679</TD>
    </TR>
    <TR>
        <TD><A HREF='/activities/105-2/vote_00018.html'>18</TD>
        <TD>2-Mar</TD>
        <TD></TD>
        <TD>Nomination Confirmed</TD>
        <TD>nomination richard 1 young to be us district judge</TD>
    </TR>
</TABLE>

</BODY>
</HTML>
```

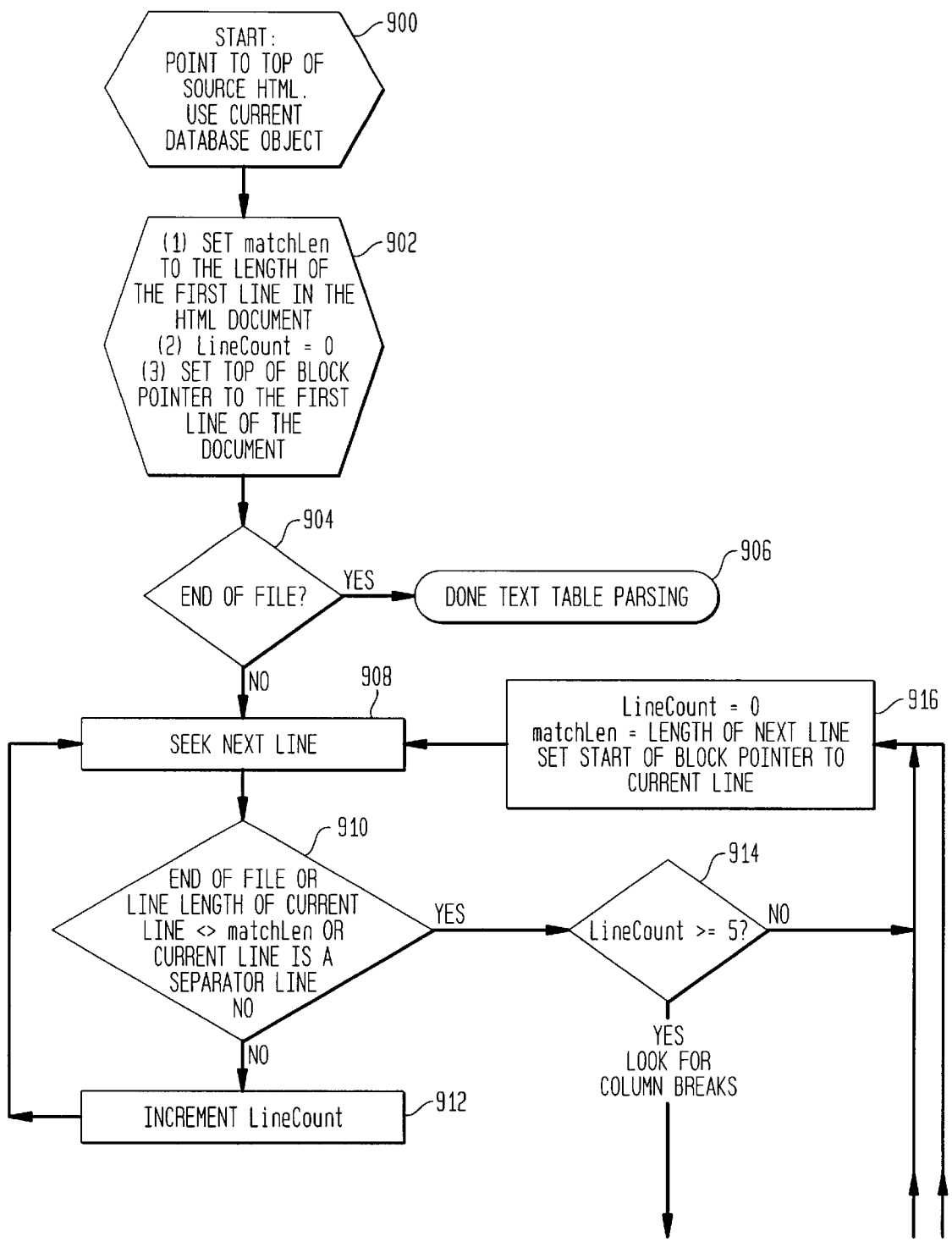

METHOD FOR PROCESSING A FILE TO GENERATE A DATABASE

REFERENCE TO PAPER APPENDIX

The present application includes a paper appendix attached hereto setting forth an exemplary implementation of an embodiment of the method according to the present invention. A portion of the disclosure of the present application contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to a method for automatically processing an HTML document or an ASCII file in order to treat the data contained within a HTML document or ASCII file as a database with one or more database management system tables.

BACKGROUND INFORMATION

The Internet provides tremendous amounts of information that is made available to the public via web sites of various organizations. A web site includes one or more web pages providing information from the sponsoring organization. For example, the United States Congress makes information on pending legislation and votes available to the public on its website. As is known in the art, Hypertext Markup Language (HTML) is the authorized language used on the Internet for creating web pages. HTML includes ASCII text surrounded by HTML commands in angle brackets which can be interpreted by an Internet web browser.

While a tremendous amount of information is available to the public via the Internet, the information is generally organized and presented in a manner selected by the owner or sponsor of the website. However, a user of the website may need to manipulate data available from a website in a particular manner. For example, a user may want to reorganize the data so that it can be manipulated using standard SQL queries. However, current web browsers, such as MICROSOFT INTERNET EXPLORER or NETSCAPE NAVIGATOR do not provide the capability to mine web pages to extract the data contained therein so that the data can be manipulated in the particular manner desired by the user, thus freeing the user from the format provided by the web site.

SUMMARY OF THE INVENTION

According to an exemplary embodiment of the present invention, a method for automatically processing a file, such as a web page or an ASCII file, is provided to treat the file as a database with one or more database tables. For example, the method according to an embodiment of the present invention automatically processes an HTML page or group of related HTML pages in an HTML frameset in order to identify data and treat the data contained within the HTML file(s) as a database with one or more database management system tables. In another embodiment of the method according to the present invention, an ASCII file can be processed to identify data and treat the data contained within the ASCII file as a database with one or more database management system tables.

The method according to the present invention can, for example, retrieve an HTML page or a group of related HTML pages in an HTML frameset from a user specified URL or from a disk file. If the source HTML document contains an HTML <FRAMESET> (e.g., a group of HTML pages each loaded into a separate frame in the browser), the method according to the present invention retrieves the HTML page associated with each frame and thus treats the entire frameset as a single database. The method according to an embodiment of the present invention scans each HTML page for any HTML tables and translates each HTML table into a database table in a database representation of the HTML page (e.g., as a DB2 database management system representation of the HTML page).

According to an embodiment of the present invention, processing is performed on each HTML table identified in an HTML page so that the HTML table can be used in a database representation. For example, if the HTML table contains an HTML <CAPTION> tag, then the caption text is used to generate the database table name. If the HTML table contains HTML <TH> tags (e.g., table header tags), then the table header text is used to generate the database table column names. If the HTML table contains <ROW SPAN> or <COL SPAN> tags (e.g., a label applied to multiple rows or columns as a category label), then the text value of the cell is replicated over the <ROW SPAN> rows or the <COL SPAN> columns to create tables which are consistent with relational database tables. All HTML escape sequences are translated to their corresponding ASCII representations. Any carriage returns and/or line feeds are, for example, removed from the data in the HTML table. Also, all HTML tags are removed from the data except for the <BR> (e.g., break) tag which is translated into, for example, a <CR> <LF> line break in the data. Leading and trailing white spaces are removed from the data in the HTML table and all internal white spaces are compressed into a single space. As a result of the processing of the data in the HTML table, the underlying data in the HTML table can be identified and extracted for inclusion in a database representing the underlying data.

The method according to an embodiment of the present invention can also identify data to be translated into a database table that is contained in a web page (e.g., an HTML document) but is not contained in an HTML table. For example, in an embodiment of the method of the present invention, each HTML page is scanned for any blocks of fixed length lines. A block is defined, for example, by five or more lines of the same length that do not contain a separator line. A separator line is defined, for example, as a line containing the same repeating character (e.g., "--------------"). For each block identified by the method according to an embodiment of the present invention, the method also identifies field breaks (e.g., column breaks) in the block. For every set of, for example, five or more contiguous lines within the block for which two or more columns are identified, a database table is created.

Similar to the processing of HTML tables, processing is performed on the text tables so that the data contained therein can be used in a database representation. For example, all HTML escape sequences are translated to their corresponding ASCII representation. Any carriage returns and/or line fields are removed from the data. All HTML tags are removed from the data except for <BR> tags which are translated into a carriage return/line feed (<CR> <LF>) line break in the data. Also, leading and trailing white spaces are removed from the data and all internal white spaces are compressed to a single space. The method according to an embodiment of the present invention also provides a user definable HeaderRows=n parameter which allows the user to specify that the top n rows of the text block are treated as column titles and are used to create the database table column names (e.g., a default behavior could be to use all of the text block as data—HeaderRows=0). Similarly, a user definable SkipBlankRow=Yes parameter allows a user to specify if blank rows are to be removed from the data (e.g., a default behavior could be that blank rows are skipped—SkipBlankRow=Yes). After a block has been processed, scanning resumes on the next line past the block and the process resumes until the entire file has been scanned.

The entire database created by the method according to an embodiment of the present invention (e.g., based on the HTML tables and text tables contained on the source file) is then reviewed and any blank tables are removed from the database. Blank tables can occur, for example, because HTML tables are often used as a page layout mechanism and not as a columnar data delivery mechanism. All of the tablenames in the database are also reviewed to make sure they are unique, without regard to case. If there are conflicting names, they are modified to make them unique (e.g., if there are two tables named "Resources," they would be renamed "Resources_1" and "Resources_2"). In addition, to conform to normal database naming conventions, any punctuation is removed from the names and spaces are changed to underscores.

BRIEF DESCRIPTION OF THE DRAWINGS

FIG. 1 illustrates an exemplary HTML source document to be processed according to an embodiment of the present invention.

FIG. 2 illustrates an exemplary HTML document containing blocks of fixed length text.

FIGS. 3A–3C illustrate an exemplary HTML document containing two HTML tables.

FIG. 4 illustrates a view of an exemplary HTML source document from an Internet browser.

FIGS. 5A and 5B illustrate a view based on an exemplary HTML source document from an Internet browser.

FIGS. 7A–7D illustrate an exemplary output from the process illustrated in FIG. 6.

FIGS. 11A and 11B illustrate an exemplary flowchart for parsing a text table according to an embodiment of the present invention.

DETAILED DESCRIPTION OF THE INVENTION

FIG. 1 illustrates an exemplary HTML document to be processed by an embodiment of the present invention. As shown in FIG. 1, the exemplary HTML document is a frame set which references two other web pages: TEXTTBL.HTM; and HTMLTBL.HTM. FIG. 2 illustrates the HTML document TEXTTBL.HTM identified in FIG. 1 which contains blocks of fixed length text. For example, web page TEXTTBL.HTM describes items for public sale and identifies the location of the items in column 210, a description of the item in column 220, a hyperlink in field 230, an identifying number for the item in column 240, the available quantity of the item in field 250 and the availability date of the item in field 260.

FIGS. 3A–3C illustrate the HTML document HTMLTBL.HTM containing two HTML tables. For example, the two tables in HTMLTBL.HTM contain U.S. Senate Roll Call Votes, one table having a border and another table having no border, as illustrated in FIGS. 5A and 5B, which is a view of the HTML document of FIG. 1 from a typical Internet browser, such as MICROSOFT INTERNET EXPLORER 4.0. As shown in FIGS. 5A and 5B, both HTML documents TEXTTBL.HTM and HTMLTBL.HTM are included in the view from the web browser as the two documents are treated by the web browser as one document with two frames (thus the term "frame set"). FIG. 4 also illustrates a view from a typical web browser of the HTML document of FIG. 1, the browser combining the HTML documents referenced in the HTML document of FIG. 1 each into its own scrolling frame.

Figure 6:
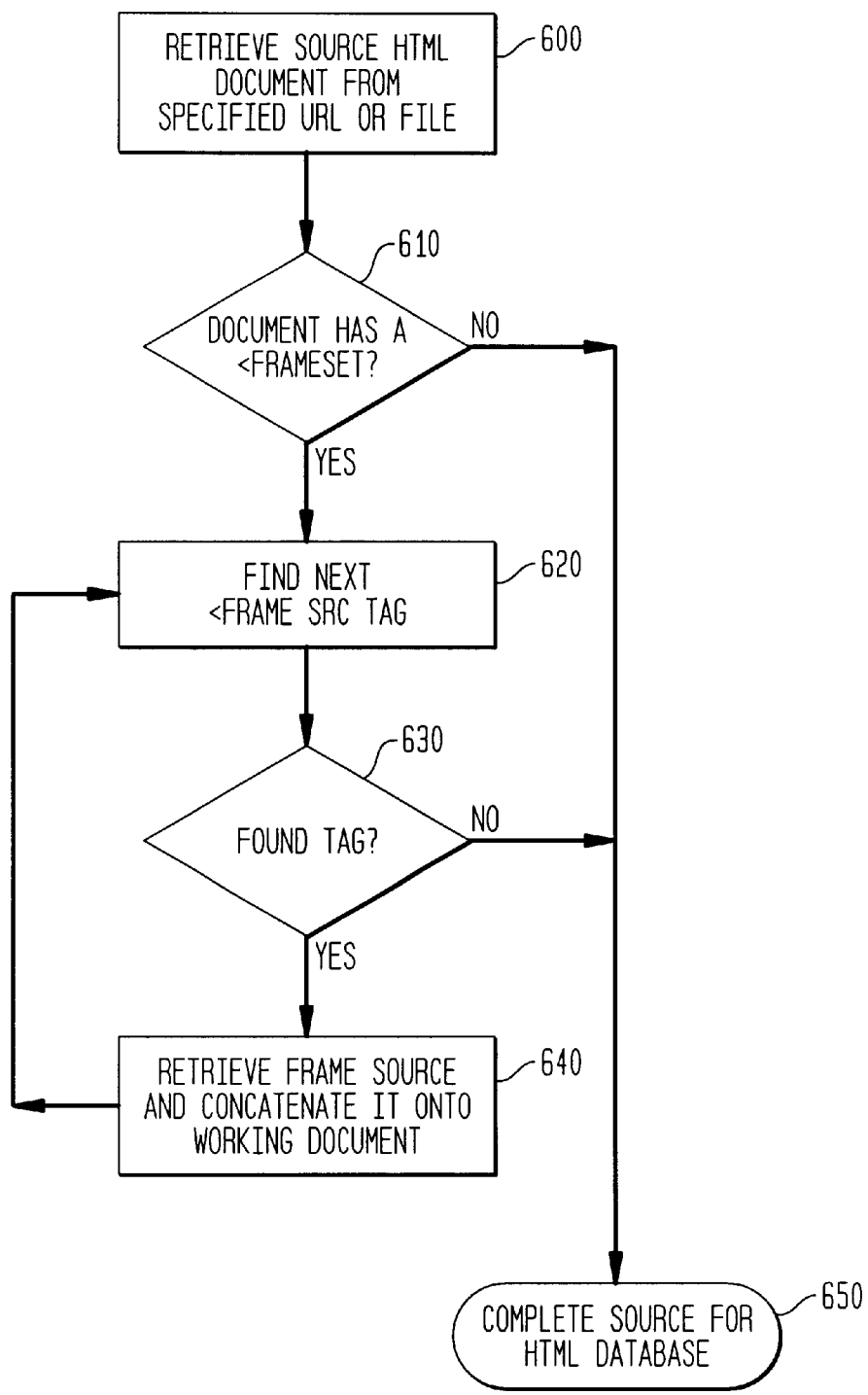
FIG. 6 illustrates an exemplary flowchart of a process for assembling a source document for parsing according to an embodiment of the present invention.

FIG. 6 illustrates an exemplary flowchart for preparing a source HTML file for parsing according to an embodiment of the present invention. The exemplary flowchart of FIG. 6 can be implemented, for example, in software that is stored in a memory of a general purpose computer and that executes on a central processing unit (cpu) of the general purpose computer. For example, a conventional personal computer including an INTEL PENTIUM processor and operating with the MICROSOFT WINDOWS operating system can carry out the method according to an embodiment of the present invention. Exemplary C++ code implementing an embodiment of the present invention is provided in the paper appendix attached hereto.

As shown in FIG. 6, in step 600, a source HTML document is retrieved from a specified universal resource locator (URL) or file. In step 610, it is determined if the HTML document has a <FRAMESET> (e.g., other pages containing the actual data to be viewed by a user). If the HTML document does not have a <FRAMESET>, then the complete source HTML document has been retrieved as indicated in step 650. If the HTML document does have a <FRAMESET>, then in step 620 the next <FRAME SRC> tag is searched for (e.g., the location of the pages containing the additional content). If a <FRAME SRC> tag is not found in step 630, then the complete source HTML document has been retrieved as indicated in step 650. If a <FRAME SRC> tag is found in step 630, then the frame source is retrieved in step 640 and the frame source is concatenated onto a working document. The method then loops back to step 620 to find the next <FRAME SRC> tag, the looping continuing until no <FRAME SRC> tag is found in step 630.

FIGS. 7A–7D illustrate an exemplary HTML working document generated by the process of FIG. 6 with regard to the exemplary HTML document shown in FIG. 1. For example, step 610 would identify the <FRAMESET tag 611 shown in FIG. 1 which would cause step 620 to search for the <FRAME SRC tag 631 shown in FIG. 1. <FRAME SRC tag 631 would be found in step 630 and the frame source referenced by <FRAME SRC 631, TEXTTBL.HTM, would be retrieved and stored into a memory in step 640, the memory being allocated for operation of the method according to an embodiment of the present invention, for example the memory of the general purpose computer that stores the executable code. The file TEXTTBL.HTM could be retrieved from, for example, a subdirectory of the host computer for the URL. Accordingly, the content of TEXTT-BL.HTM shown in FIG. 2 is concatenated into a working document as shown in FIGS. 7A and 7B.

Looping back to step 620, the method according to the present invention would look for another <FRAME SRC tag in the HTML document of FIG. 1 and would find <FRAME SRC tag 632 in step 630. Thus, in step 640, the frame source reference by tag 632, HTMLTBL.HTM, would be retrieved and stored in the allocated memory as described above. Accordingly, the content of HTMLTBL.HTM shown in FIGS. 3A–3C would be concatenated into the working document with TEXTTBL.HTM in step 640 as shown in FIGS. 7B, 7C and 7D. Similar to TEXTTBL.HTM, the file HTMLTBL.HTM could be retrieved, for example, from a subdirectory of the host computer for the URL.

Figure 8A:
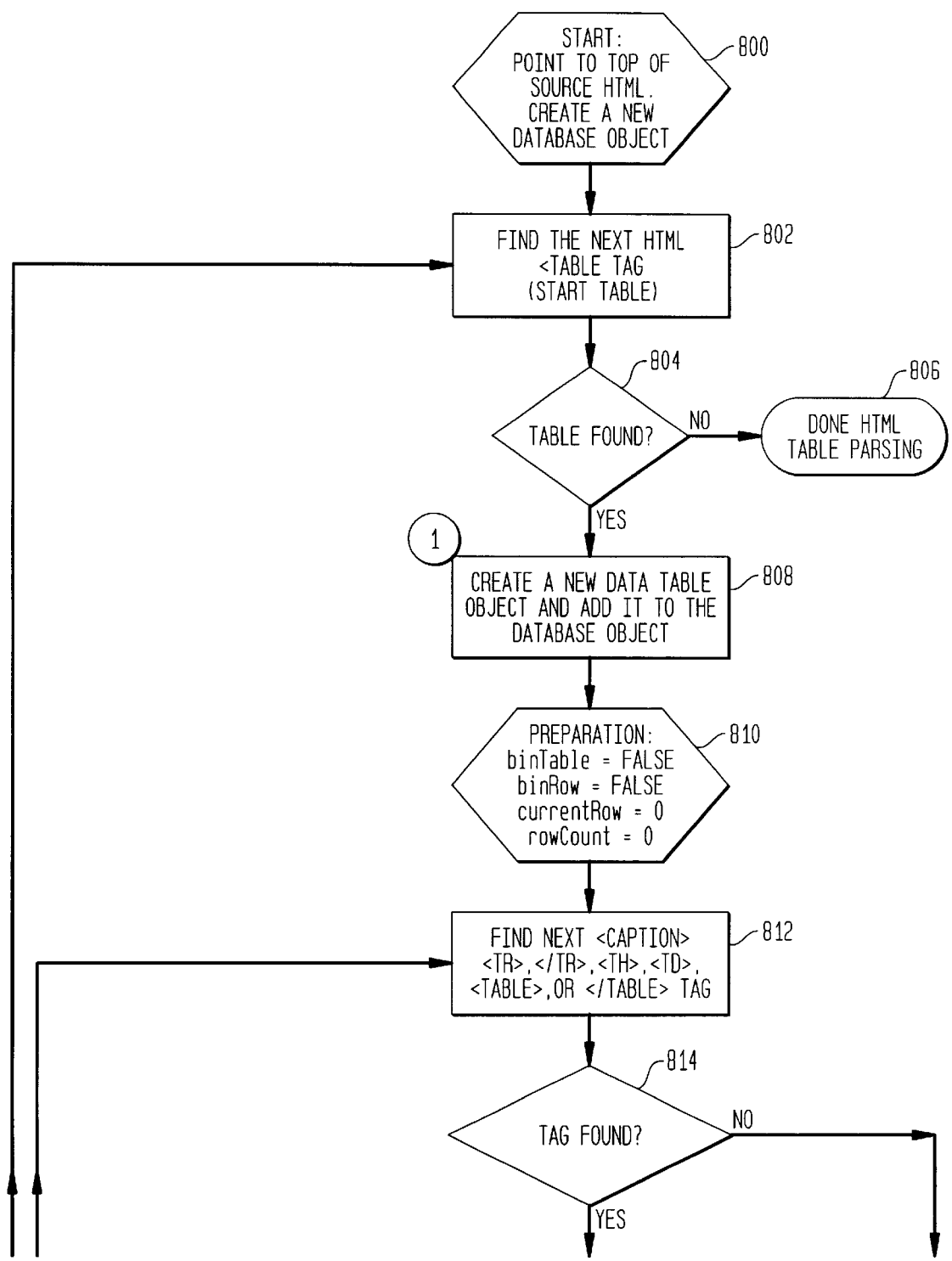
FIGS. 8A–8C illustrate an exemplary flowchart for parsing HTML tables according to an embodiment of the present invention.
Figure 8B:
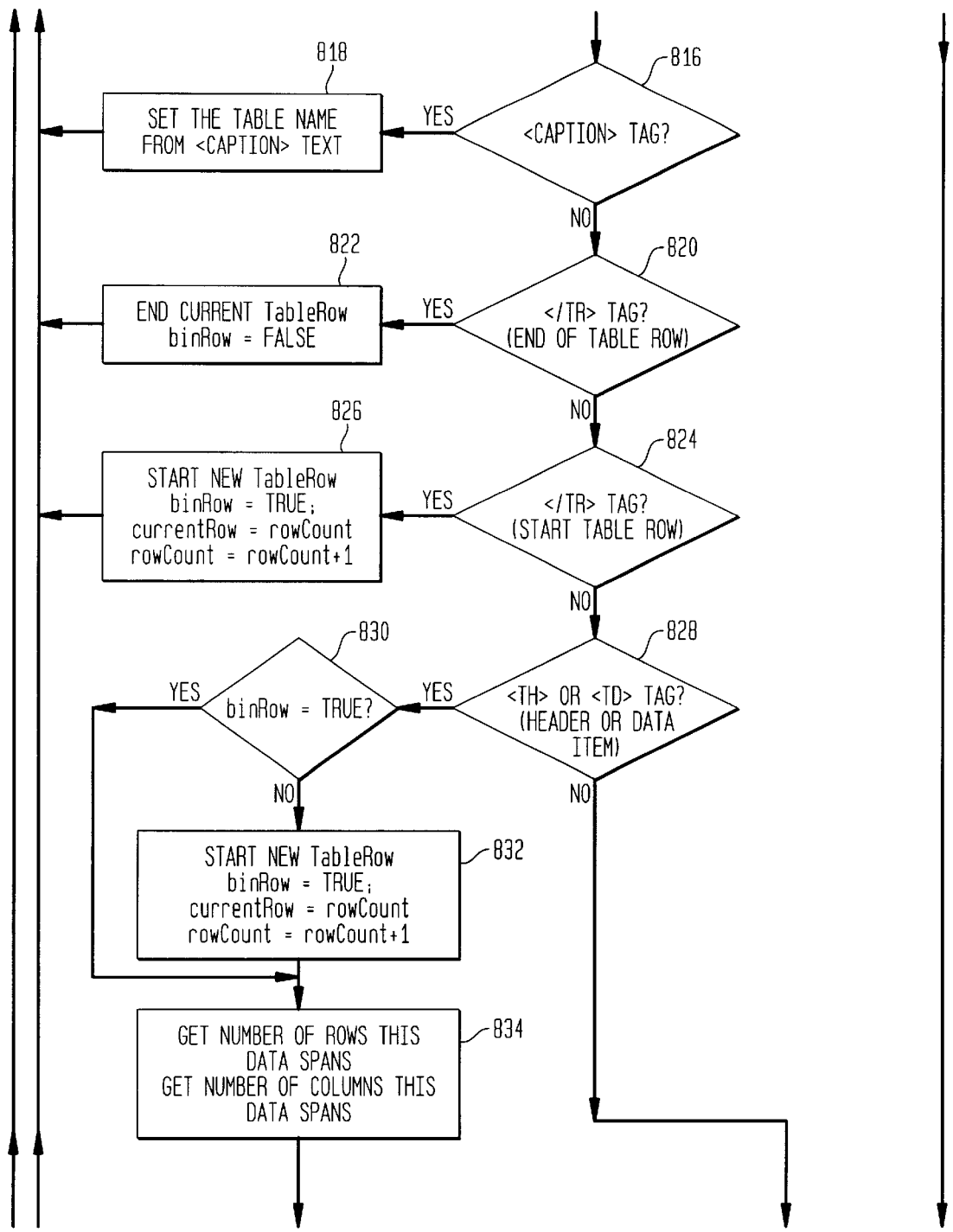
Figure 8C:
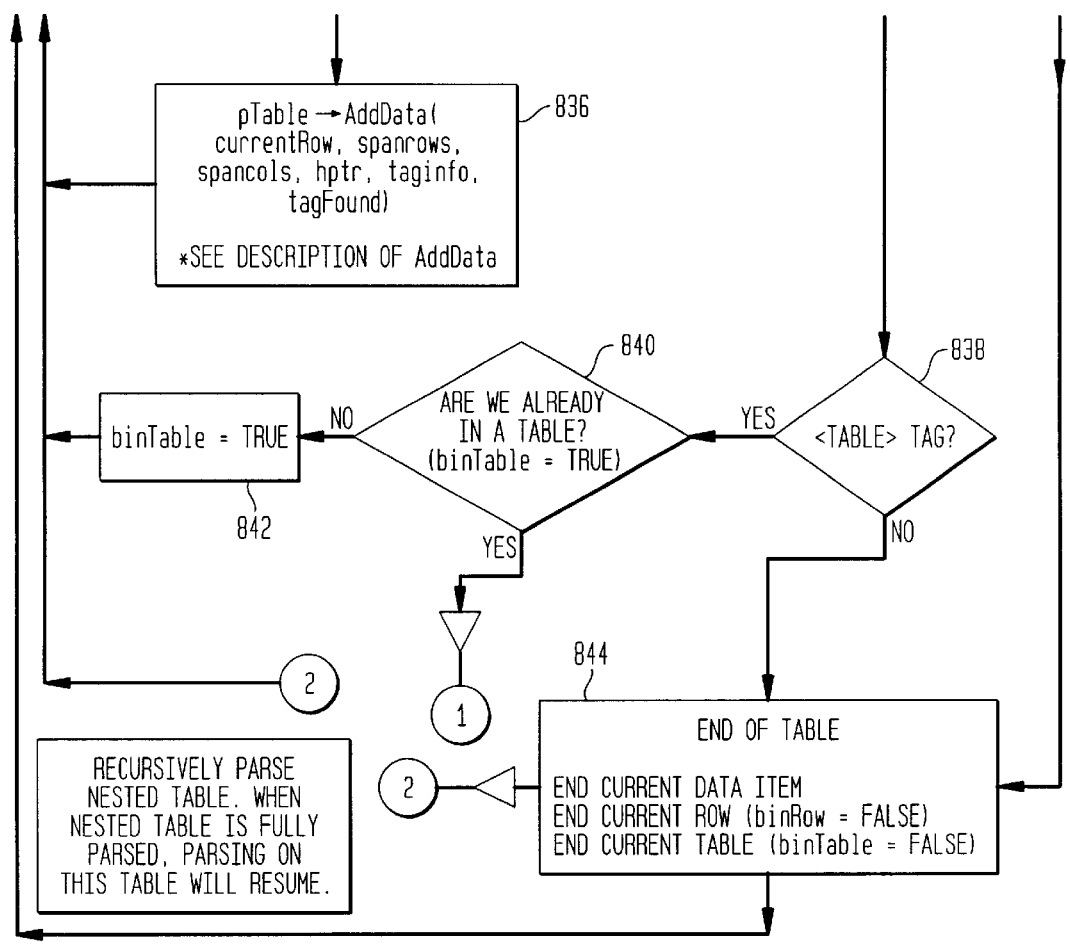

FIGS. 8A and 8B and 8C illustrate an exemplary flowchart for parsing an HTML table from an HTML document according to an embodiment of the present invention. The exemplary flowchart of FIGS. 8A and 8B and 8C can be implemented, for example, in software that is stored in the memory of a general purpose computer and that executes on a central processing unit (cpu) of the general purpose computer as described previously. Exemplary C++ code implementing an embodiment of the present invention is provided in the paper appendix attached hereto.

In step 800, the method according to an embodiment of the present invention points to the top of an HTML source, such as the concatenated working file illustrated in FIGS. 7A–7D obtained via the exemplary flowchart shown in FIG. 6. Also in step 800, a new database object is created for the database to be created for the source HTML document. For example, any database software package can be used to establish the database object, such as standard database packages from IBM, ACCESS, ORACLE or SYBASE. In step 802 the HTML document is read and in step 804 it is determined if a HTML table is in the HTML document. If no table tag is found, then the HTML table parsing is completed in step 806.

If a table tag is found in step 804, then in step 808 a new DataTable Object would be created and added to the Database Object created in step 800. Thus, step 808 creates a physical database object that can be subsequently populated with data extracted from the HTML table as described below. As is known in the art, the DataTable Object can be created by any standard database package and can utilize, for example, a set of cooperating C++ objects to manage the data. In the method according to the present invention, initial preparation for the loading of data into the DataTable Object is performed in step 810 to initialize the starting conditions of the DataTable Object so that data can be added to the object in an organized manner, for example, by adding rows and columns as necessary. For example, the variables bInTable, bInRow, currentRow and rowCount can be used to track the current location of the exemplary method illustrated in FIGS. 8A–8C with respect to the DataTable Object. In step 812, the HTML document is read so that, for example, particular HTML tags can be found that are utilized to parse the source HTML document to identify data to be extracted, such as a caption tag (<CAPTION>), a start or end of table row tag (<TR> or </TR>), a table header tag (<TH>), a data item tag (<TD>) or a start or end of table tag (<TABLE>, </TABLE>). If one of these particular tags is not found in step 814, then the end of the table is identified in step 844. By searching for particular tags in step 812, an HTML document can be parsed according to an embodiment of the invention so that only HTML tags that are likely to lead to data appropriate for extraction into a database are processed and other HTML tags can be ignored.

If one of the particular HTML tags is found in step 814, then in step 816 it is determined if it is a caption tag. If the HTML tag is a caption tag, then in step 818 the table name of the DataTable Object created in step 808 is determined as a function of the caption tag text, for example by conforming the caption tag text to standard database table naming rules (e.g., replacing a space with an underscore), and the process returns to step 812 to find the next particular HTML tag. If the HTML tag is not a caption tag, then in step 820, it is determined if the HTML tag is an end of table row tag (e.g., </TR>). If the HTML tag is an end of table row tag, then in step 822, the current table row in the DataTable Object is ended and bInRow is set to FALSE (thus indicating that the DataTable Object is no longer in a row) and the process returns to step 812 to find the next particular HTML tag. If the HTML tag is not an end of row tag, in step 824 it is determined if the HTML tag is a start of table row tag (e.g., <TR>). If the HTML tag is a start of table row tag, then in step 826, a new table row is started in the DataTable Object and bInRow is set to TRUE, currentRow is set to rowCount and rowCount is set to rowCount+1 to indicate that a new row has been created and also the identity of the current row and the process returns to step 812 to find the next particular HTML tag.

If the HTML tag is not a start of table row tag, then in step 828, it is determined if the HTML tag is a header or data item tag (e.g., <TH> or <TD>). If the HTML tag is a header or data item tag, then in step 830 it is determined if bInRow is set to TRUE (e.g., whether or not the DataTable Object is currently in a row). If bInRow is not set to TRUE, then a new table row is started in the DataTable object in step 832 and bInRow is set to TRUE, currentRow is set to rowCount and rowCount is set to rowCount+1. Following step 832, or if bInRow is set to TRUE in step 830, then in step 834 the number of rows and columns of the data in the HTML header or data item tag is determined (e.g., to determine if the tag has a ROWSPAN or a COLSPAN attribute and thus spans more than one row or column) so that the appropriate number of rows and columns are added to the DataTable Object to hold the underlying data.

Before adding the data from the header or data item tag to the DataTable Object, the end of the data is determined by looking ahead in the HTML document until the corresponding end tag is found (e.g., </TR> or </TD>). In addition, the data is cleaned before it is added to the DataTable Object. For example, all HTML escape sequences are translated to their corresponding ASCII representations and any carriage returns and/or line feeds are removed from the data in the HTML table. Also, all HTML tags are removed from the data except for the <BR> (e.g., break) tag which is translated into, for example, a <CR> <LF> line break in the data. Leading and trailing white spaces are removed from the data in the HTML table and all internal white spaces are compressed into a single space.

Then, in step 836, the data extracted from the HTML header or data item tag is loaded into the DataTable object. For example, starting with the current row, the data is added to the next available column in the current row. If there is a COLSPAN attribute, then the data is replicated (e.g., repeated a number of times defined by the COLSPAN value) and then added to the current table row beginning at the next available column. If there is a ROWSPAN attribute, then the data is added to the next available column of the current row and additional rows are added (e.g., additional rows are added equal to the ROWSPAN value minus one) and the data is added to the same column in each of the newly added rows. If the data has ROWSPAN and a COLSPAN attributes, then both actions are combined so that the data is replicated for columns and rows.

If step 828 determines that the HTML tag is not a header or data item tag, then in step 838 it is determined if the HTML tag is an HTML table tag (e.g., to determine if another table is nested in the table identified in step 804). If the HTML tag is not a table tag, then in step 844 the end of the table is reached. If the HTML tag is a table tag, however, then in step 840 it is determined if the process is already in an HTML table (e.g., if bInTable is set to TRUE, the process is already in a table and a nested table has now been identified). If the process is not in a table, then bInTable is set to TRUE in step 842 and the process returns to step 812 to identify the next particular HTML tag.

However, if the process is already in a table, then the process returns to point 1 identified in FIG. 8A to recursively call the table processing routine so that a new DataTable Object is created for the new table that has been identified in steps 838 and 840. The process then proceeds through, for example, steps 808–838 for the new table until the end of the new table is reached or another table identified. In this manner, nested HTML tables in an HTML document can be identified and treated as individual database tables according to an embodiment of the present invention.

When the end of a table is reached in step 844, the process returns to point 2 shown on FIG. 8C which returns to step 812 to find the next particular HTML tag in the HTML document to resume parsing the outer HTML table.

Figure 9:
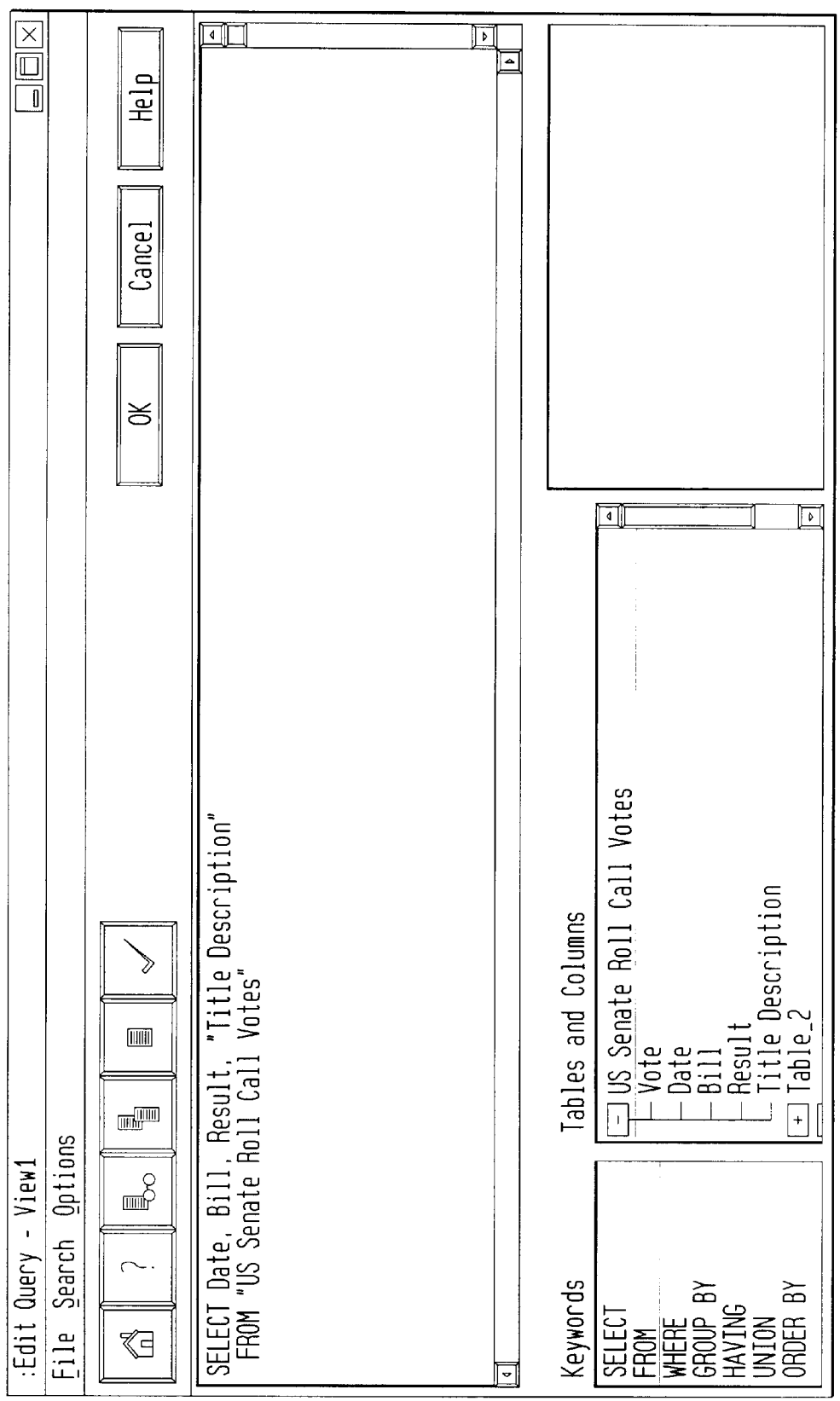
FIG. 9 illustrates an exemplary view of a resultant database obtained via an embodiment of the present invention, including an exemplary SQL query to be run against the database.
Figure 10:
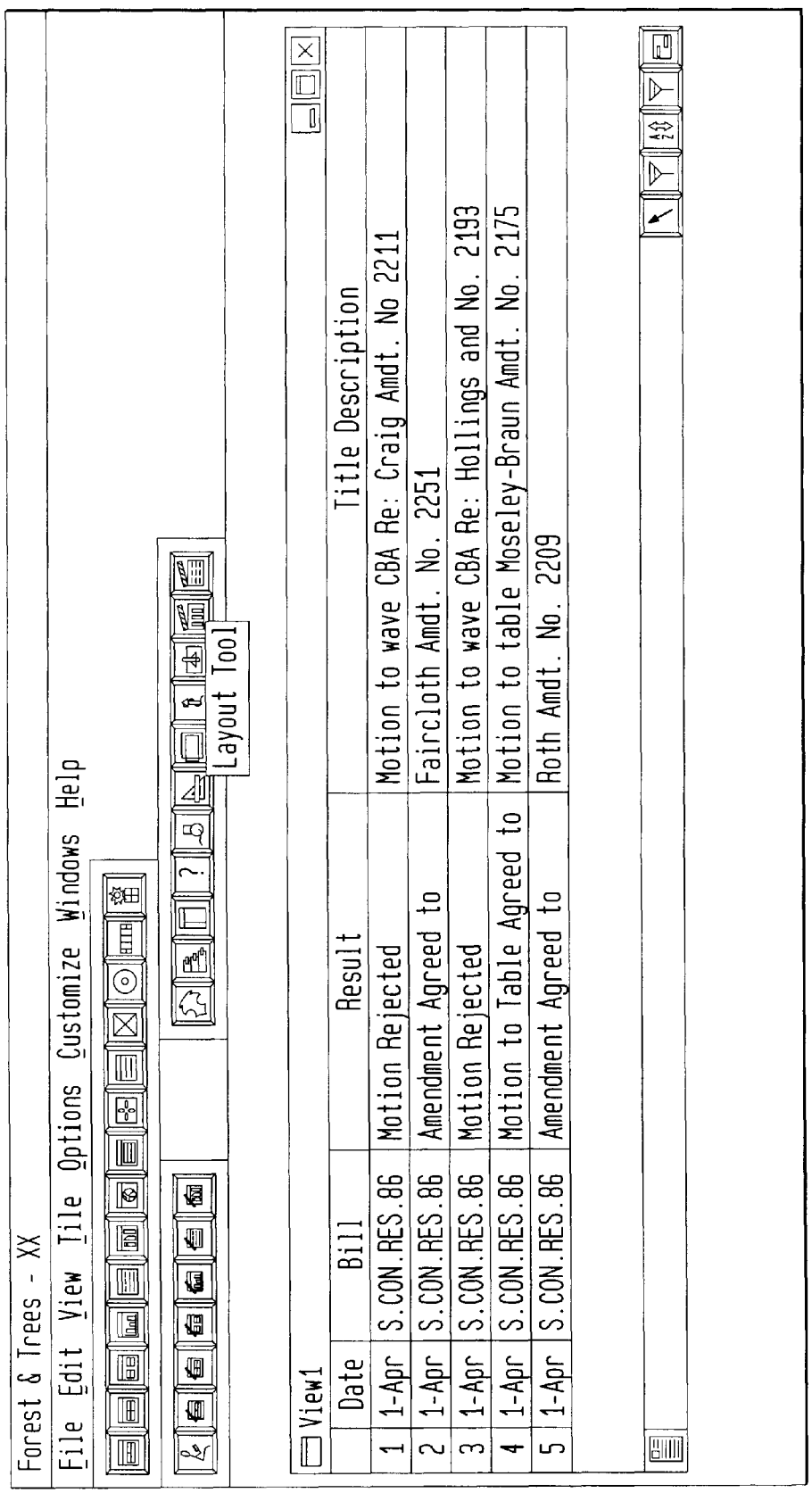
FIG. 10 illustrates an exemplary output according to an embodiment of the present invention from a SQL query.

FIG. 9 illustrates an exemplary view of a resultant database obtained via an embodiment of the present invention, including an exemplary SQL query to be run against the database. For example, using the exemplary HTML working document illustrated in FIGS. 7A–7D, FIG. 9 shows the SQL keywords that can be used to formulate a SQL query as well as the tables and columns that have been identified by the parsing of the HTML document according to an exemplary embodiment of the present invention. In this case a SELECT query for the date, bill, result and title description (e.g., the fields selected for display by a user of a database system operating in conjunction with an embodiment of the method according to the present invention) is requested via the SQL query from the database table US SENATE ROLL CALL VOTES. FIG. 10 illustrates an exemplary output according to an embodiment of the present invention from the SQL query shown in FIG. 9. Accordingly, FIG. 10 shows the data originally obtained from the HTML source document but that has been processed as a database table that can now be viewed via a standard SQL query.

Figure 11B:
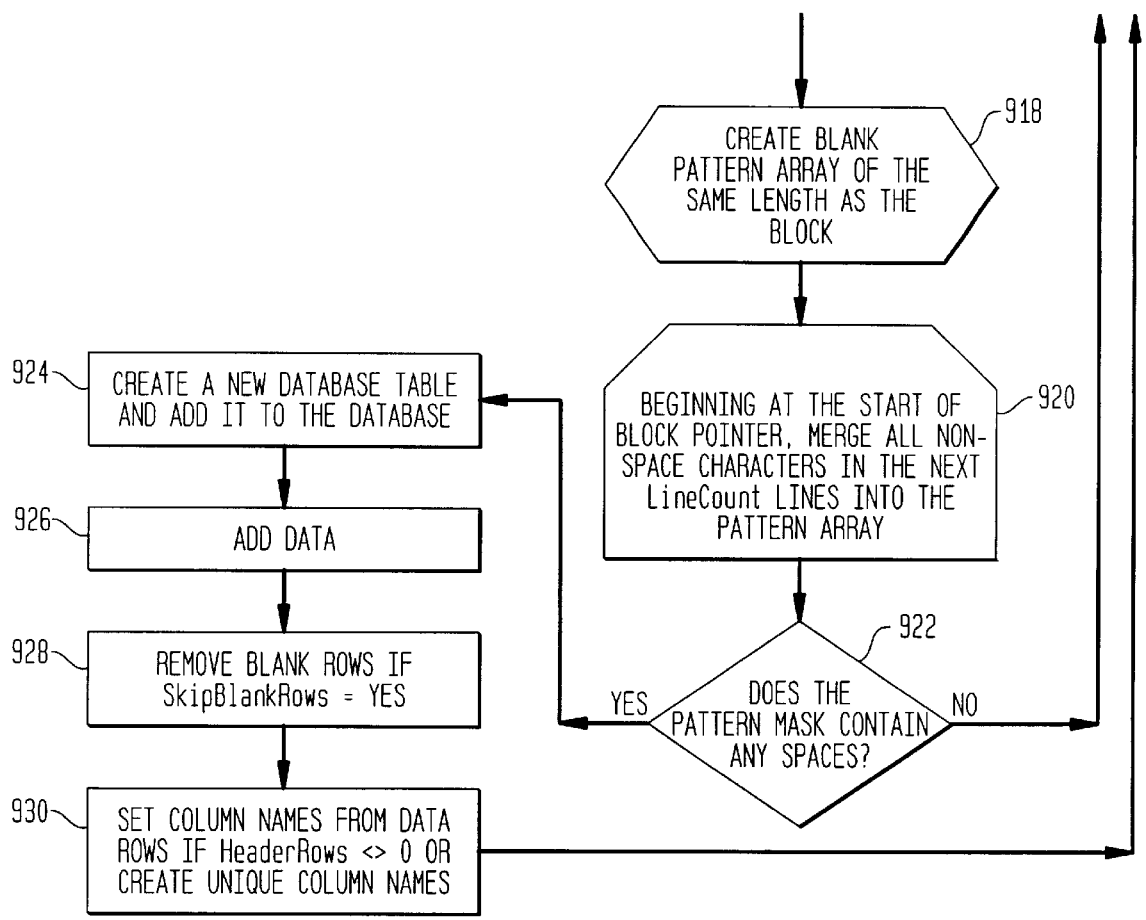

FIGS. 11A and 11B illustrates an exemplary flowchart for parsing a text table according to an embodiment of the present invention. For example, if an HTML source document contains, in addition to an HTML table that can be parsed as described above, a block of text containing data suitable for representation as a database, then an embodiment of the present invention can also parse through the HTML document to identify the text block and process the text block for representation as a database table.

As shown in FIGS. 11A and 11B, in step 900 the method according to the present invention points to the top of the HTML source document, for example the HTML document obtained via the exemplary method according to the present invention illustrated in FIG. 6. Also in step 900, a new database object is created for the database to be created for the source HTML document. For example, any database software package can be used to establish the database object, such as standard database packages from IBM, ACCESS, ORACLE or SYBASE. If a database object has already been created for the HTML document, for example due to a prior parsing of the HTML document to process HTML tables contained in the HTML document, then step 900 will utilize the database object that has already been created.

In step 902, various parameters are initialized so that the parsing process can keep track of the progress through the HTML document as the HTML document is read. For example, the variable matchLen is set to the length of the first line in the HTML document and the variable LineCount is set to 0. In addition, a pointer for the block of text is set to the first line of the HTML document. In step 904, it is determined if the line of the HTML document contains an end of file (EOF) indicator. If an EOF indicator is identified in step 904, then in step 906 the parsing of the text table is completed. If no EOF indicator is identified in step 904, then in step 908 the next line in the HTML document is read. In step 910, it is determined if an EOF indicator is identified, if the line length of the current line in the text block is different from the matchlen value (e.g., if the line length differs from the length of the first line) or if the current line is a separator line (e.g., a repeating character such as "---------"). If none of the conditions in step 910 are satisfied (e.g., there is a match of the current line and the previous line), then in step 912 the LineCount variable is incremented and the process returns to step 908 to read the next line in the HTML document. If any of the conditions in step 910 are satisfied (e.g., the current line does not match the previous line), then it is determined in step 914 if the LineCount variable is equal to or greater than, for example, five. If the LineCount variable is less than five, a text block has not been identified and then in step 916 the LineCount variable is reset to 0, the matchLen variable is set to the length of the next line and the block pointer is set to the current line so that a search can begin for another text block.

If the LineCount is equal to or greater than five in step 916, a text block has been identified and the method according to an embodiment of the present invention looks for column breaks. For example, in step 918 a blank pattern array is created, the blank pattern array having the same length as the text block (e.g., the same value as matchLen). In step 920, beginning at the start of the block pointer, which is set for the first line in the text block, the non-space characters in the next LineCount lines are merged into the pattern array. According to an embodiment of the present invention, any HTML tags that are included in a line of the text block are treated as a character (e.g., a non-space character) for merging into the pattern array. For example, assuming a matchLen of 80 characters, for example, each line of the text block would merge its non-space characters into the same 80 characters of the pattern array. In step 922, it is determined if the pattern array contains any spaces. For example, if there were common locations in each line of the text block that contained spaces, then the merging of all of the text block lines into the pattern array would leave spaces in the pattern array. Similarly, if there were no common locations having spaces in the lines of the text block, then the merging into the pattern array would not leave any spaces in the pattern array. Therefore, it can be determined in step 922 whether there are any locations in the pattern array containing a space and thus indicating a discernable column. If there are no spaces in the merged pattern array in step 922, then there are no discernable columns and the process returns to step 916 to start a search for a new text block.

If there are spaces in the merged pattern array, then in step 924 a new DataTable Object is created for the text block that has been identified and the new DataTable Object is added to the Database Object for the HTML source document. In step 926, the data from the text block that has been identified is added to the DataTable object. Prior to adding any data to the DataTable Object, however, the data is processed cleaned. For example, all HTML escape sequences are translated to their corresponding ASCII representations and any carriage returns and/or line feeds are removed from the data in the text block. Also, all HTML tags are removed from the data except for the <BR> (e.g., break) tag which is translated into, for example, a <CR> <LF> line break in the data. Leading and trailing white spaces are removed from the data in the text table and all internal white spaces are compressed into a single space.

To add the data to the DataTable Object in step 926, the method according to an embodiment of the present invention starts at the top of the block pointer and adds the data from each column of each line in the text block into the DataTable Object. For example, the start location, stop location and length of each column in the text block can be determined as a function of the merged pattern array (e.g., the spaces in the merged pattern array define the columns in the text block and column information can be stored in a pattern array buffer). Therefore, for each line in the text block and for each column in the pattern buffer, the method according to the present invention extracts the length of data starting at the start position for the current column and adds the data to the DataTable Object. Each column in the text block is processed in the same manner. Unlike adding data from an HTML table, there are no ROWSPAN or COLSPAN attributes in a text block and thus each data value is written to a single location in the DataTable Object.

In step 928, any blank rows in the DataTable Object can be removed if, for example, a variable such as SkipBlankRows is set to Yes. In step 930, unique column names can be created or the column names can be set from the data rows if, for example, a variable such as HeaderRows is not equal to 0. For example, the method according to an embodiment of the present invention provides a user definable HeaderRows=n parameter which allows the user to specify that the top n rows of the text block are treated as column titles and thus can be used to create the database table column names (e.g., a default behavior could be to use all of the text block as data—HeaderRows=0). Similarly, a user definable SkipBlankRow=Yes parameter allows a user to specify if blank rows are to be removed from the data (e.g., a default behavior could be that blank rows are skipped—SkipBlankRow=Yes). After a text block has been processed, scanning resumes on the next line past the block and the process resumes in step 916 until the entire file has been scanned.

The method according to an embodiment of the present invention can also be used to parse an ASCII file to identify any data in the ASCII file that can be represented as a database. For example, to parse an ASCII file, the method described with regard to FIGS. 11A and 11B could be used with the modification of eliminating the steps in the cleaning process relating to translating HTML escape sequences and removing all HTML tags as an ASCII file would not contain HTML data. Furthermore, there would be no need to parse the ASCII file for an HTML table as described with regard to FIGS. 8A and 8B and 8C as the ASCII file would not contain an HTML table.

What is claimed is:

1. A method of processing data in a file, comprising the steps of:

reading the file, the file having data in a plurality of data formats;

identifying one or more blocks of data within the file;

extracting a plurality of data items from the one or more blocks of data;

automatically generating one or more database tables to correspond to the one or more blocks of data; and loading the plurality of data items into the one or more database tables.

2. The method according to claim 1, wherein the file includes at least one of an HTML file and an ASCII file.

3. The method according to claim 1, wherein the database table includes a database table of a relational database.

4. A method for generating a database table from a HTML file, comprising the steps of:

retrieving a source HTML document;

retrieving a source HTML frameset document and merging the source HTML frameset document into the source HTML document if the source HTML document references the HTML frameset document;

creating a database object for the source HTML document;

identifying a HTML table in the source HTML document;

creating a datatable object for the HTML table;

parsing the HTML table to extract data for storage in the datatable object; and loading the extracted data into the datatable object.

5. The method according to claim 4, wherein the step of retrieving the source HTML document includes retrieving the source HTML document from one of a universal resource locator (URL) and a file.

6. The method according to claim 4, wherein the step of retrieving the source HTML document includes identifying each page of the source HTML document and concatenating each page into a working document.

7. The method according to claim 4, wherein the step of creating the database object is accomplished via a database software application.

8. The method according to claim 4, wherein the step of identifying the HTML table includes reading the source HTML document and identifying a table tag.

9. The method according to claim 4, wherein the datatable object populated with data extracted from the HTML table is included in the database object.

10. The method according to claim 9, wherein the step of creating the datatable object is accomplished via a database software application.

11. The method according to claim 4, wherein the step of parsing the HTML table includes reading the source HTML document to identify at least one predetermined HTML tag.

12. The method according to claim 11, wherein the at least one predetermined HTML tag includes at least one of a caption tag, a start of row tag, an end of row tag, a table header tag, a data item tag, a start of table tag and an end of table tag.

13. The method according to claim 12, wherein when the at least one predetermined HTML tag includes one of a table header tag and a data item tag, a content of the respective tag is extracted for loading into the datatable object.

14. The method according to claim 13, wherein prior to extracting the content of the respective tag, the content is cleaned.

15. The method according to claim 14, wherein the cleaning includes at least one of:

translating an HTML escape sequence to a corresponding ASCII representation;

deleting a carriage return;

deleting a line feed;

deleting leading and trailing white spaces;

compressing internal white spaces into a white space; and deleting remaining HTML tags.

16. The method according to claim 12, further comprising the step of, when the predetermined HTML tag includes a start of table tag, determining if a nested HTML table has been identified.

17. The method according to claim 16, wherein if a nested HTML table is identified, the steps of creating a datatable object, parsing the HTML table and loading the extracted data are repeated for each nested HTML table.

18. A method for generating a database table from a text table in a source HTML document, comprising the steps of:

retrieving a source HTML document;

creating a database object for the source HTML document;

identifying text data in the source HTML document to translate into a database table, the text data not tagged as HTML table data;

creating a datatable object for the text data; and loading the text data into the datatable object.

19. The method according to claim 18, wherein the step of identifying the text table includes:

reading the source HTML document to identify a predetermined number of lines in the source HTML document having a matching length; and identifying at least one column break in the predetermined number of lines.

20. The method according to claim 19, wherein the step of identifying at least one column break includes:

generating a blank pattern array;

merging each non-space character of each line of the predetermined number of lines into the pattern array; and identifying any spaces in the merged pattern array, each space in the merged pattern array identifying a column break.

21. The method according to claim 20, wherein a start location, a stop location and a length of each column in the text table are determined as a function of the column break.

22. The method according to claim 21, wherein the loading step is performed as a function of the start location, stop location and length of each column in the text table.

23. The method according to claim 22, wherein prior to the loading step, a content of the text table is cleaned.

24. The method according to claim 23, wherein the cleaning includes at least one of:

translating an HTML escape sequence to a corresponding ASCII representation;

deleting a carriage return;

deleting a line feed;

deleting leading and trailing white spaces;

compressing internal white spaces into a white space; and deleting remaining HTML tags.

25. A method for generating a database table from a text table in an ASCII file, comprising the steps of:

retrieving an ASCII file;

creating a database object for the ASCII file;

identifying one or more text tables in the ASCII file;

creating one or more datatable objects to correspond to the one or more text tables; and automatically loading data from the one or more text tables into the corresponding one or more datatable objects.

26. The method according to claim 25, wherein the step of identifying the text table includes:

reading the ASCII file to identify a predetermined number of lines in the ASCII file having a matching length; and identifying at least one column break in the predetermined number of lines.

27. The method according to claim 25, wherein the step of identifying at least one column break includes:

generating a blank pattern array;

merging each non-space character of each line of the predetermined number of lines into the pattern array; and identifying any spaces in the merged pattern array, each space in the merged pattern array identifying a column break.

28. The method according to claim 27, wherein a start location, a stop location and a length of each column in the text table are determined as a function of the column break.

29. The method according to claim 28, wherein the loading step is performed as a function of the start location, stop location and length of each column in the text table.

30. The method according to claim 29, wherein prior to the loading step, a content of the text table is cleaned.

31. The method according to claim 30, wherein the cleaning includes at least one of:

deleting a carriage return;

deleting a line feed;

deleting leading and trailing white spaces; and compressing internal white spaces into a white space.

32. A method for generating a database table from a HTML file, comprising the steps of:

retrieving a source HTML document;

creating a database object for the source HTML document;

identifying a HTML table in the source HTML document;

creating a first datatable object for the HTML table;

parsing the HTML table to extract data for storage in the first datatable object;

loading the extracted data into the first datatable object;

identifying text data in the source HTML document to translate into a database table, the text data not tagged as HTML table data;

creating a second datatable object for the text data; and loading the text data into the second datatable object.

* * * * *